(12) United States Patent
Takahashi et al.

(10) Patent No.: US 7,362,933 B2
(45) Date of Patent: Apr. 22, 2008

(54) OPTICAL BRANCHING UNIT

(75) Inventors: Fumio Takahashi, Yokohama (JP); Koji Ishikawa, Yokohama (JP); Norihiro Tajima, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 11/594,529

(22) Filed: Nov. 8, 2006

(65) Prior Publication Data
US 2007/0053636 A1   Mar. 8, 2007

Related U.S. Application Data

(63) Continuation of application No. PCT/JP2005/008704, filed on May 12, 2005.

(30) Foreign Application Priority Data
May 14, 2004   (JP)   ............... 2004-145032

(51) Int. Cl.
*G02B 6/42*   (2006.01)
*G02B 6/10*   (2006.01)
(52) U.S. Cl. ...................... 385/45; 385/132
(58) Field of Classification Search ............. 385/45, 385/129–132, 135
See application file for complete search history.

(56) References Cited

U.S. PATENT DOCUMENTS

| | | | |
|---|---|---|---|
| 5,091,986 A | 2/1992 | Arii et al. | |
| 5,586,209 A | 12/1996 | Matsuura et al. | |
| 5,627,928 A * | 5/1997 | Matsuura et al. | 385/45 |
| 5,889,902 A * | 3/1999 | Laube et al. | 438/31 |
| 6,463,188 B1 * | 10/2002 | Takahashi et al. | 385/14 |
| 2003/0016914 A1 | 1/2003 | Kim | |
| 2003/0133662 A1 | 7/2003 | Kim et al. | |

FOREIGN PATENT DOCUMENTS

| | | |
|---|---|---|
| EP | 0 428 951 A2 | 5/1991 |
| EP | 0 651 267 A1 | 5/1995 |

(Continued)

OTHER PUBLICATIONS

Notification Concerning Transmittal of Copy of International Preliminary Report on Patentability, Chapter 1 of the Patent Cooperation Treaty, and Written Opinion of the International Searching Authority, dated Nov. 23, 2006, for PCT/JP2005/008704, 5 sheets.

*Primary Examiner*—Frank G. Font
*Assistant Examiner*—Charlie Peng
(74) *Attorney, Agent, or Firm*—Frishauf, Holtz, Goodman & Chick, P.C.

(57) ABSTRACT

In an optical branching unit according to the invention, the cross section shape in an area of a front stage to branch to two output waveguides in the optical branch is a rectangle or a non-circle with different vertical-to-horizontal ratio, including an area that the length along the surface of the substrate is defined to be shorter than the length in the direction orthogonal to the surface of a substrate, the cross section at the output ends of the output waveguide is a rectangle or a non-circle with a different vertical-to-horizontal ratio, where the length along the surface of the substrate is defined to be longer than the length in the direction orthogonal to the surface of the substrate.

11 Claims, 5 Drawing Sheets

FOREIGN PATENT DOCUMENTS

| | | |
|---|---|---|
| EP | 1 279 974 A2 | 1/2003 |
| EP | 1 327 897 A2 | 7/2003 |
| JP | 63-128304 A | 5/1988 |
| JP | 4-140701 A | 5/1992 |
| JP | 4-172308 A | 6/1992 |
| JP | 07-174929 A | 7/1995 |

* cited by examiner

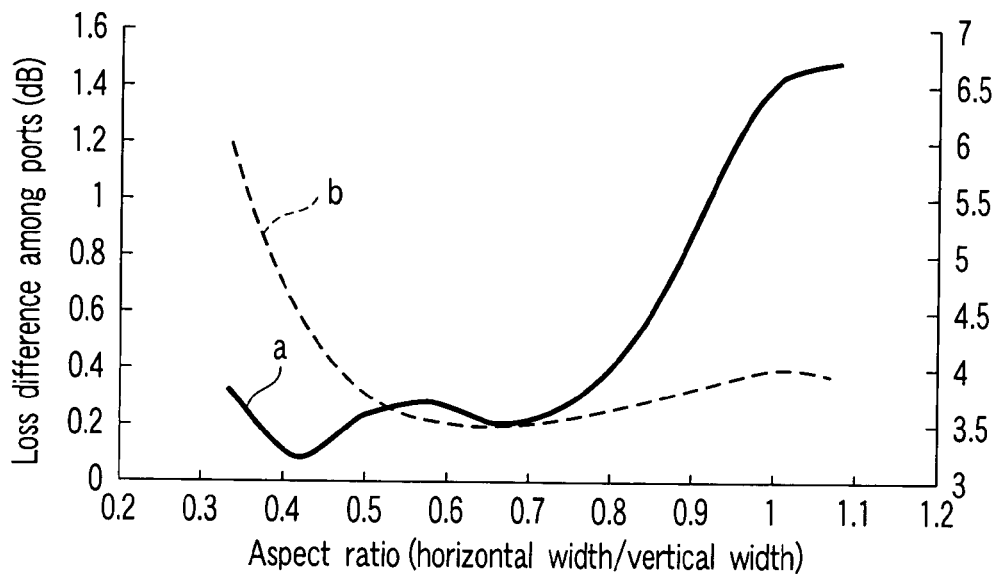
F I G. 6
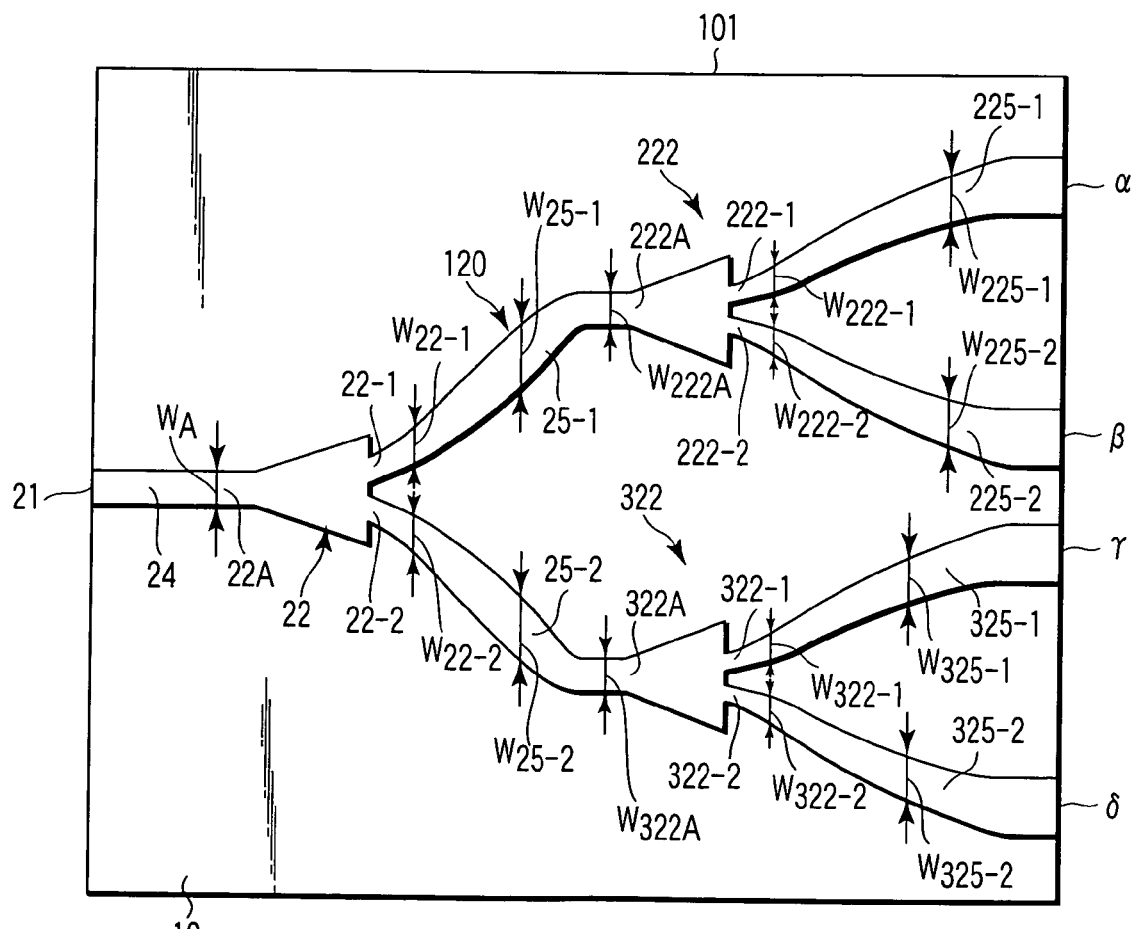
F I G. 7

OPTICAL BRANCHING UNIT

CROSS-REFERENCE TO RELATED APPLICATIONS

This is a Continuation Application of PCT Application No. PCT/JP2005/008704, filed May 12, 2005, which was published under PCT Article 21(2) in Japanese.

This application is based upon and claims the benefit of priority from prior Japanese Patent Application No. 2004-145032, filed May 14, 2004, the entire contents of which are incorporated herein by reference.

BACKGROUND OF THE INVENTION

1. Field of the Invention

The present invention relates to an optical branching unit, which is usable in the field of optical communication, and outputs a light beam input to an input end to a plurality of output end.

2. Description of the Related Art

In an optical branching unit using an optical waveguide, it is particularly desired as an optical characteristic that the wavelength uniformity of insertion loss is not varied in each branching destination, namely, the wavelength uniformity of each destination is substantially equal.

For example, Jpn. Pat. Appln. KOKAI Publication No. 4-172308 discloses a Y-branch optical circuit, which includes, as a part of an input waveguide, a waveguide whose higher mode is cutoff, and a low equivalent diffractive index in a ground mode is lower than that of the other waveguides formed in a substrate.

However, even in the proposal disclosed in the above Publication No. 4-172308, the wavelength uniformity varies in each branching destination when a light beam guided to the input waveguide is displaced from the axial line or a center axis of the input waveguide. The wavelength characteristic is particularly lowered in a shorter wavelength side.

Further, the input waveguide of an optical branching unit is connected to an optical fiber, for example, and an optical signal transmitted in the optical fiber is applied (input). In many cases, an input waveguide is glued to an optical fiber, and it is difficult to completely prevent displacement between the waveguide axial line and the optical fiber center axis, during gluing the waveguide and optical fiber or hardening the glue.

BRIEF SUMMARY OF THE INVENTION

It is an object of the present invention to provide an optical branching unit, which is capable of decreasing emission of light to an output end of a branching destination after the light is branched by an optical branching unit, capable of decreasing a loss, and has a high wavelength uniformity of loss in the output side, even if displacement occurs between an input waveguide to input a light beam from the outside of a substrate and an optical transmission member outside a substrate.

This invention is provided an optical branching unit comprising:

a holding substrate which holds an optical branch structure to branch a light beam at a predetermined optical branching ratio;

an input waveguide which guides a light beam applied to the optical branch structure from the outside of the holding substrate, to the optical branch structure; and first and second output waveguides which guide the light beam branched through the optical branch structure to be emitted to an optical waveguide structure provided independently of the holding substrate, wherein the end-face of the input waveguide is defined so that the length in the direction vertical to the holding substrate, or the height, is larger than the length in the direction along the holding substrate, in the plane orthogonal to the input direction of the light beam; and the end-faces of the first and second output waveguides are defined so that the length in the direction along the holding substrate is larger than the length in the direction vertical to the holding substrate, or the height.

Namely, according to the above-mentioned optical branching unit, emission of a multimode component to an output end of a branching destination after being branched by a branch structure is decreased, when displacement occurs between an input waveguide to input a light beam from the outside of a holding substrate to hold an optical branch structure and an optical transmission structure outside the substrate, and variations in the wavelength uniformity of loss are compensated in the output side. Therefore, the wavelength uniformity of loss is increased in each branching destination.

Further, this invention is provided an optical branching unit having an input waveguide to input light from the outside of a substrate, an optical branch to branch the light input to the input waveguide at a predetermined branching ratio, and output waveguides to output each light branched by the optical branch at a predetermined branching ratio to the outside of the substrate, on a substrate, in which the light input from the outside of the substrate is branched at a predetermined branching ratio, and output to the outside of the substrate, wherein the cross section shape at a predetermined position between the input waveguide and optical branch is a rectangle or a non-circle with different vertical-to-horizontal ratio, including an area that the length along the surface of a substrate is defined to be shorter than the length in the direction orthogonal to the surface of a substrate; and the cross section at an outputting end of each output waveguide is a rectangle or a non-circle with a different vertical-to-horizontal ratio, where the length along the surface of a substrate is defined to be longer than the length in the direction orthogonal to the surface of a substrate.

Namely, in an optical branching unit which branches an input light from the outside of a substrate at a predetermined branching ratio, and emits the light to the outside of a substrate, the cross section at a predetermined position between the input waveguide and optical branch is a rectangle or a non-circle with a different vertical-to-horizontal ratio, including an area that the length along the surface of a substrate is defined to be shorter than the length in the direction orthogonal to the surface of a substrate; and the cross section at the output end of each output waveguide is a rectangle or a non-circle with a different vertical-to-horizontal ratio, where the length along the surface of a substrate is defined to be longer than the length in the direction orthogonal to the surface of a substrate. Therefore, emission of a multimode component to an output end of a branching destination after being branched by the optical branching unit is decreased, when an axis displacement occurs between an input waveguide to input a light beam from the outside of a substrate and an optical transmission member outside the substrate, and variations in the output wavelength uniformity are compensated in an output side. Therefore, the wavelength uniformity of loss is increased in each branching destination.

Also, this invention is provided an optical branching unit comprising:

substrate which includes a surface defined by a first direction and a second direction orthogonal to the first direction;

an input waveguide which is provided along the surface of the substrate, and inputs light from the outside of the substrate;

a first optical branching unit which is provided at a predetermined position on the surface of the substrate, and branches the light input from the outside of the substrate at a predetermined ratio;

a second optical branching unit which is provided at a predetermined position on the surface of the substrate, and branches one of the light branched by the first optical branching unit at a predetermined ratio, further at a predetermined ratio;

a third optical branching unit which is provided at a predetermined position on the surface of the substrate, and branches the other of the light branched by the first optical branching unit at a predetermined ratio, further at a predetermined ratio; and output waveguides which are provided at predetermined positions on the surface of the substrate, at the position in the second and third optical branching units as an outputting end with respect to the first optical branching unit, and output the light branched by the second and third optical branching units to the outside of the substrate, wherein an optical waveguide part connecting the first optical branching unit and second branching unit, and an optical waveguide part connecting the first optical branching unit and third optical branching unit are defined includes in at least a part an area that the length in the direction orthogonal to the surface direction of the substrate is defined longer than the length along the surface direction.

Namely, in the above-mentioned optical branching unit, an optical waveguide which connects an optical branching unit to input a light beam from the outside of a substrate, to a plurality of optical branching unit provided among a plurality of output waveguide provided to emit a light beam divided into several beams to the outside of a substrate, includes at least an area that the length in the direction orthogonal to the surface of a substrate is defined longer than the length along the surface direction. When several stages of optical branching unit are arranged in series, it is possible to compensate variations in the wavelength uniformity of a light beam emitted to the output end to emit a light beam to the outside of a substrate. Therefore, the wavelength uniformity of loss is increased in each branching destination, and a loss of the whole branching unit is decreased.

BRIEF DESCRIPTION OF THE SEVERAL VIEWS OF THE DRAWING

FIG. 6 is a graph explaining the principle of decreasing variations in the wavelength uniformity with respect to an axis displacement, by setting the aspect ratio shown in FIG. 4 and FIG. 5;

FIG. 7 is a schematic diagram explaining another embodiment of the optical branching unit shown in FIG. 1 and FIG. 2.

DETAILED DESCRIPTION OF THE INVENTION

Hereinafter embodiments of the invention will be explained in detail with reference to the accompanying drawings.

Figure 1:
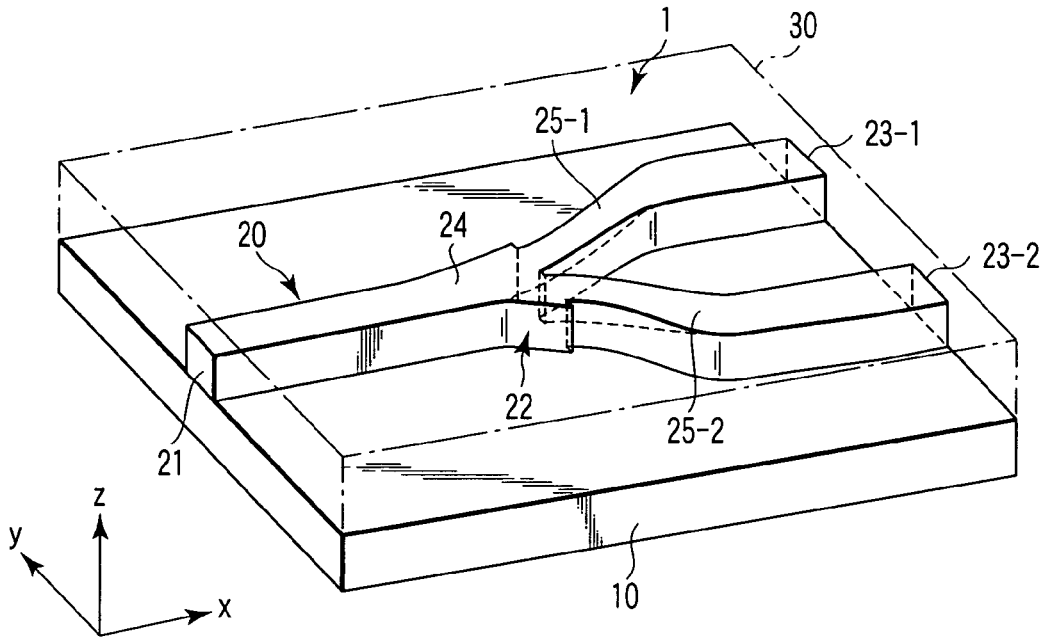
FIG. 1 is a schematic illustration explaining an example of an optical branching unit according to an embodiment of the invention.

FIG. 1 is a schematic illustration explaining an example of an optical branching unit according to an embodiment of the invention.

As shown in FIG. 1, an optical branching unit 1 has a substrate composed mainly of silicon dioxide ($SiO_2$), and an optical waveguide structure 20 formed by patterning in a predetermined shape on the substrate 10. The space surrounding the optical waveguide structure 20 is covered by a member functioning as a clad layer 30 to make the optical waveguide structure 20 usable as a core. A relative index difference between the core portion (optical waveguide structure 20) and clad area (clad layer 30) is 0.45%.

The optical waveguide structure 20 includes an input end 21 to input a light beam (an optical signal) supplied through a not-show optical transmission member, such as an optical fiber and an optical branching unit in a preceding stage, an optical branch 22 to branch the optical signal applied to the input end 21 at first and second ratios, and output ends 23-1 and 23-2 to guide an optical signal branched through the optical branch 22 to a not-shown single mode fiber or an optical branch unit in a succeeding stage. Hereinafter, a waveguide structure between the input end 21 and optical branch 22 is called an input waveguide 24, and optical waveguide structures between the optical branch 2 and two output ends 23-1 and 23-2 are called output waveguides 25-1 and 25-2.

The optical waveguide structure 20 is formed by patterning a quartz glass composed mainly of silicon oxide and formed in a predetermined thickness on the substrate 10. The optical waveguide structure 20 can also be formed by doping phosphorous (P), titanium (Ti), germanium (Ge) or aluminum (Al) in a core or a part corresponding to the optical waveguide structure 20, after stacking a member corresponding to the clad layer 30 to a predetermined thickness. The optical waveguide structure 20 can also be formed by selectively lowering a refractive index by doping boric acid (B) or fluorine (F) in an area corresponding to the clad layer 30, after stacking a material with a refractive index usable as a core to a predetermined thickness in all areas of the substrate 10. Further, the optical waveguide structure 20 can also be formed by using a multi-component glass including an optional component with a thermal expansion ratio of lower than approximately $3.5 \times 10^{-6}$ and by selectively changing a refractive index of an area corresponding to a core (the optical waveguide structure 20) by exchanging an ion by the well-known ion exchanging method.

Figure 2:
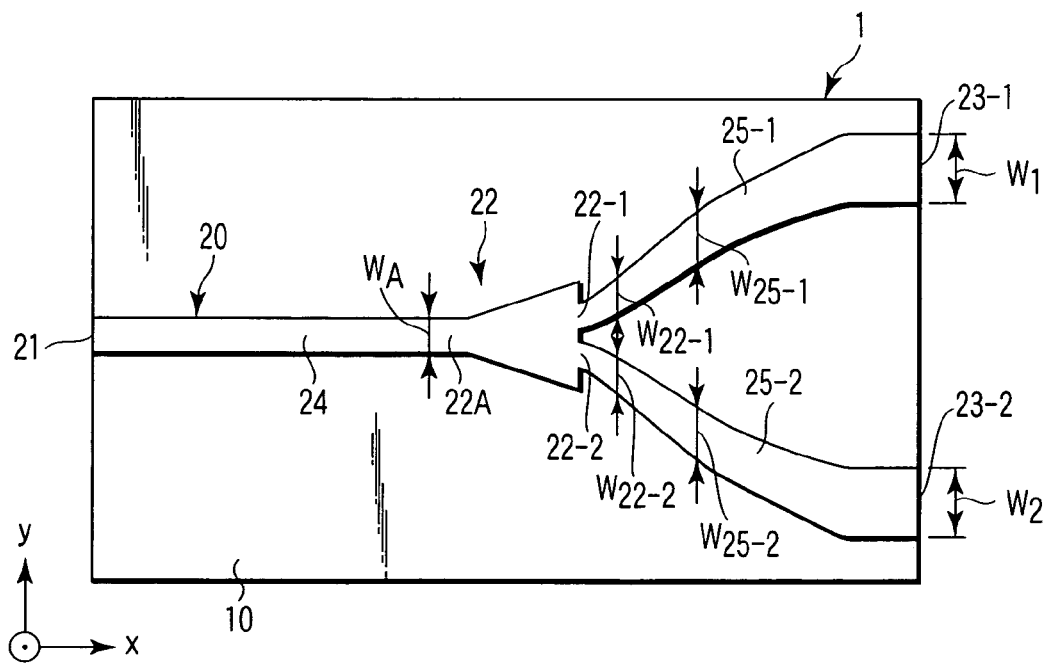
FIG. 2 is a schematic diagram of the optical branching unit shown in FIG. 1 viewed from the plane (z-axis) direction.

FIG. 2 shows the optical branching unit viewed in FIG. 1 in the plane (z-axis) direction.

As shown in FIG. 2, the optical branch 22 is formed integrally with the output ends 23-1/23-2, input waveguide 24, and output waveguides 25-1 and 25-2, as an optical waveguide structure 20, according to the manufacturing process. However, the optical branch is divided into an input part 22A which is supplied with an optical signal from the outside of the substrate 10, for example, a not-shown optical fiber used to input an optical signal, or an optical signal from an optical branching unit in the preceding stage, through the input waveguide 24, and first and second output parts 22-1 and 22-2 to input an optical signal branched at a predetermined ratio to two output waveguides 25-1 and 25-2.

In the output parts 22-1 and 22-2 of the optical branch 22, in the cross section at each position, or on the x-y plane (the state that the optical waveguide structure 20 is projected on the substrate 10 from the z-axis direction), the width $W_{22-1}$ or $W_{22-2}$ that is the direction along the surface direction of the substrate, 10 or the length in the y-axis direction, is defined narrower than the width $W_{25-1}$ or $W_{25-2}$ that is the length in the y-axis direction at an optional position in the corresponding output waveguides 25-1 and 25-2. The width $W_{22-1}$ or $W_{22-2}$ of the output part 22-1 or 22-2 are defined to be equal to or slightly narrower than the width $W_A$ of the input waveguide 24 and the input part 22A of the optical branch 22. On the other hand, the widths $W_{22-1}$ and $W_{22-2}$ of the output parts 22-1 and 22-2 are not necessarily equal, and at least one of the widths $W_{22-1}$ and $W_{22-2}$ may be formed equal to or slightly narrower than the width $W_A$.

The output waveguides 25-1 and 25-2 have the shape, in the cross section at each position or on the x-y plane (the state that the optical waveguide structure 20 is projected on the substrate 10 from the z-axis direction), to connect the output parts 22-1 and 22-2 of the optical branch 22 to the first and second output ends 23-1 and 23-2 of the optical waveguide structure 20, respectively, by a continuous curve or arc.

Figure 3A:
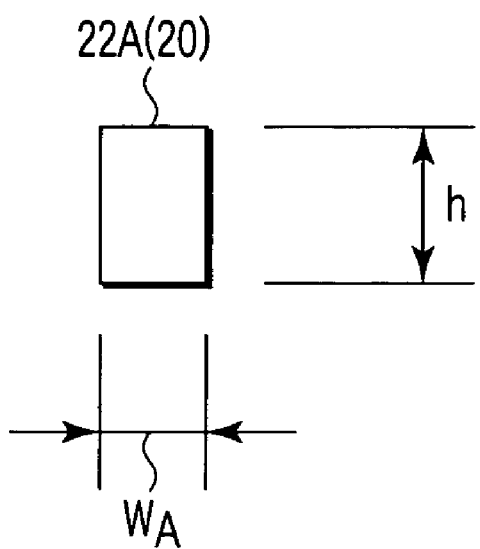
FIG. 3A is view explaining the characteristic of a cross section of an optical waveguide structure of the optical branching unit shown in FIG. 1 and FIG. 2.

The input part 22A has, as shown in FIG. 3A, a cross section whose length in the direction along the surface direction of the substrate 10 (the y-axis direction) is defined shorter (narrower) than the length, or the height h, in the direction orthogonal to the surface direction of the substrate 10 (the z-axis direction). In particular, the width $W_A$ of the input part 22A is defined to be the width (the length in the y-axis direction) defined by 0.4-0.8, as explained later with reference to FIG. 4, when the height h from the substrate 10 of the optical waveguide structure 20, or the thickness of the layer used as a core is assumed to be '1'.

Figure 3B:
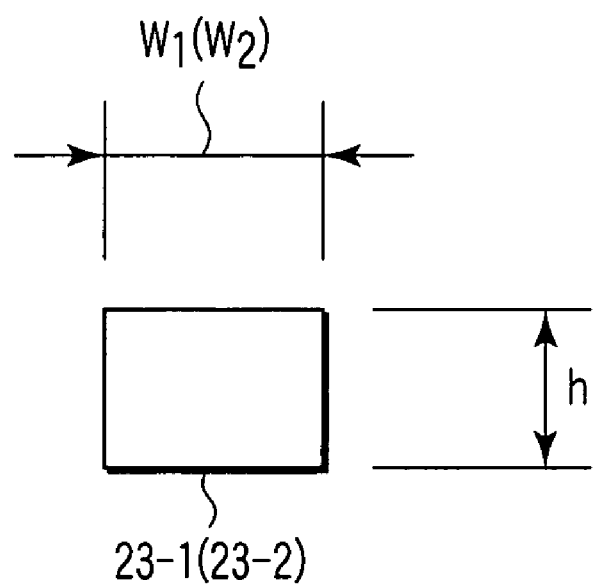
FIG. 3B is view explaining the characteristic of a cross section of an optical waveguide structure of the optical branching unit shown in FIG. 1 and FIG. 2.

The output waveguides 25-1 and 25-2 has, as shown in FIG. 3B, a cross section whose length in the direction orthogonal to the surface direction of the substrate 10 (the z-axis direction) is defined narrower (namely, the height h is defined lower) than the length or the width in the direction along the surface direction of the substrate 10 (the y-axis direction). In particular, the length in the y-axis direction of at least one of the output waveguides 25-1 and 25-2, or the width in the sectional direction, has the width (the length in the y-axis direction) $w_1$ or $w_2$ defined to 1.0-1.5, as explained later with reference to FIG. 4, when the height h from the substrate 10 of the waveguide structure 20, or the thickness (the height h) of the layer used as a core portion is assumed to be '1'. The width $w_1$ or $w_2$ is preferably 1.2-1.5, when the height h is assumed to be '1'.

In other words, the optical waveguide structure 20 is given, at a predetermined position in the preceding stage of the optical branch 22, a cross section shape to be $W_A < h$, in the state viewed from the direction orthogonal to the light transmission direction in the optical waveguide structure 20 (the x-axis direction). The optical waveguide structure 20 is also given a cross section shape to be at least $w_1 > h$ or $w_2 > h$, in the state viewed from an optional position in the direction orthogonal to the direction that the light branched by the optical branch 22 of the optical waveguide structure 20 is transmitted to the output ends 23-1 and 23-2 along the x-y plane. The $w_1$ and $w_2$ are preferably set to $w_1 = w_2$, when the branch ratio in the optical branch 22 is equal.

Figure 4:
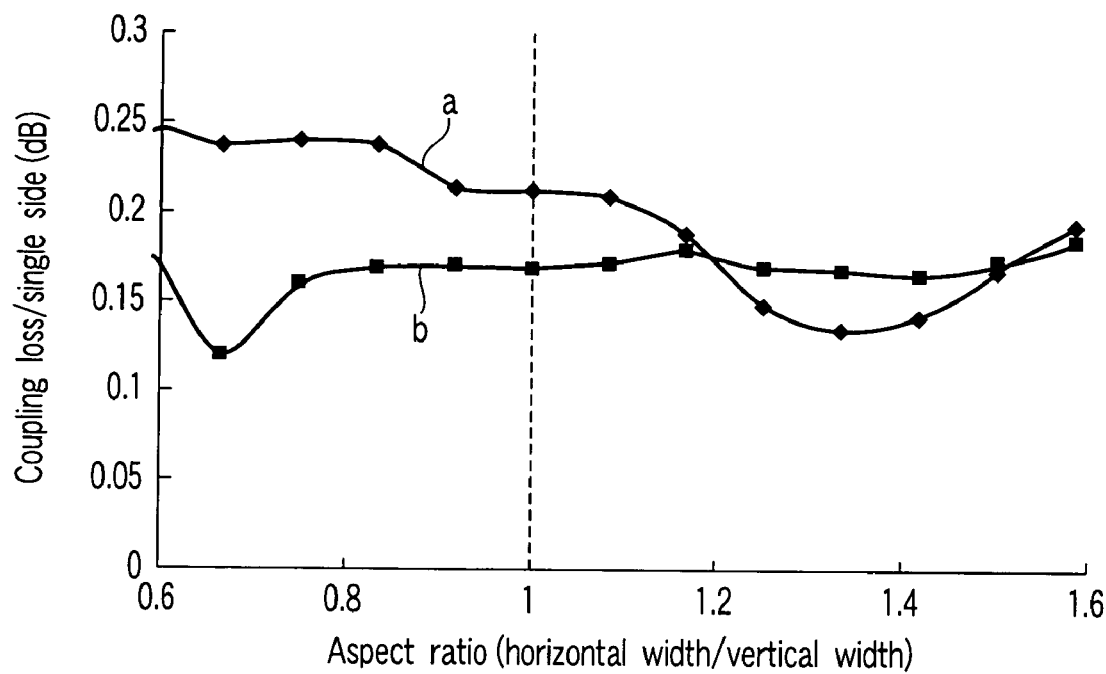
FIG. 4 is a graph explaining the relationship between the aspect ratio of an optional position of the optical waveguide structure of the optical branching unit shown in FIG. 1 and FIG. 2, and the total loss of the cross section.

FIG. 4 is a graph showing the relationship between a total loss generated in the optical waveguide structure and the characteristics of the shapes of the input part and output waveguide explained in FIGS. 3A and 3B, as a ratio of the height in the cross section (vertical width = length in the z-axis direction) to the horizontal width (length in the y-axis direction), that is, an aspect ratio.

It is seen from FIG. 4 that the optical branching unit of this invention can be used to prevent variations in the insertion loss with respect to the standard value 1310 nm (the curve a) in the shorter wavelength side used to evaluate the loss in the optical waveguide or optical fiber and the standard value 1550 nm (the curve b) in the longer wavelength side. In particular, the insertion loss is increased in the wavelength of 1310 nm by setting the aspect ratio of the cross section shape in the input side of the branch (the input end 21 in FIG. 2) to smaller than "1". Contrarily, the insertion loss in the output side is decreased by setting the aspect ratio to larger than "1".

Since the insertion loss (total loss) is evaluated from the numeric values including the loss in the input and output sides and the loss in the core portion, it is seen from FIG. 4 that variations in the insertion loss can be decreased. Similarly, as to the light with the wavelength of 1550 nm, the insertion loss difference between the input side and output side is smaller than the light with the wavelength of 1310 nm, and variations in the total loss are decreased.

When the aspect ratio in the input side is set to smaller than "1", it is necessary to consider an axis displacement from the not-shown optical fiber that is an optical transmission member to transmit the input light to the optical branch 22 or optical waveguide structure 20 explained in FIG. 1 and FIG. 2, or the optical branching unit in the preceding stage.

Figure 5:
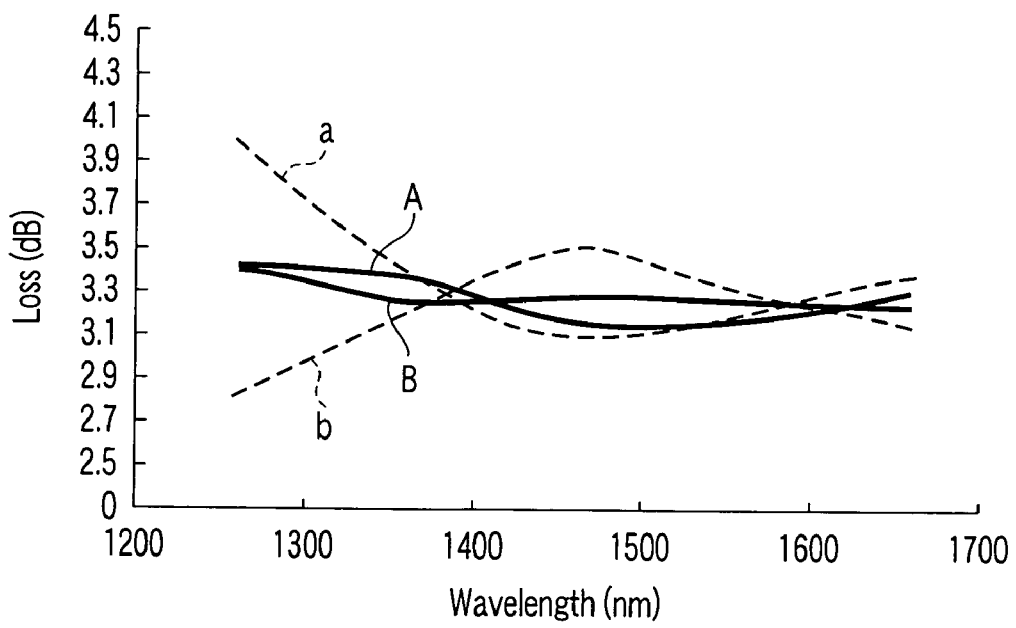
FIG. 5 is a graph explaining the relationship among the aspect ratio of an optional position of the cross section of the optical waveguide structure of the optical branching unit shown in FIG. 1 and FIG. 2, and the state of changing the largeness of a loss between the output side ports (variations in the wavelength uniformity)

FIG. 5 a graph explaining the state of changing the largeness of a loss among the output side ports (variations in the wavelength uniformity) by changing the aspect ratio of the input side cross section of the optical waveguide structure. In FIG. 5, the solid line curves A and B indicate the wavelength dependency of the loss in the first output waveguide 25-1 (FIG. 2) and second output waveguide 25-2 (FIG. 2), when the center axis of the not-shown optical transmission member is deviated along the surface of the substrate 10 (FIG. 2) only by 0.5 μm with respect to the axial line in the input side of the optical waveguide structure, by setting $W_A$ to 4 μm and h to 6 μm, in the optical waveguide structure having the input part whose cross section shape is $W_A < h$ as explained in FIG. 3A. The broken line curves a and b indicate the wavelength dependency of the loss in two output waveguides by using an optical waveguide structure having an input part whose center axis of a not-shown optical transmission member is deviated along the surface of a substrate only by 0.5 μm with respect to the axial line in the input side of the optical waveguide structure, by setting the cross section shape to $W_A=h=6$ μm, as an comparison example.

As seen from FIG. 5, by setting the aspect ratio of the cross section of the input side of the optical waveguide structure to smaller than "1", variations in the loss are largely decreased with respect to light of 1260-1660 nm including the standard value 1310 in the shorter wavelength side and the standard value 1550 nm in the longer wavelength side used for evaluation of loss.

This indicates that the wavelength uniformity can be increased, similar to the case of setting the aspect ratio in the input side to smaller than "1" as previously explained in FIG. 4. This also indicates that variations in the wavelength uniformity can be decreased, even if an axis displacement occurs between the center axis of a not-shown optical transmission member and the axial line in the input side of the optical waveguide structure.

The reason why the variations in the wavelength uniformity are decreased by setting the aspect ratio in the input side to smaller than "1" (making the core cross section vertically long) is that the multimode component generated by the axis displacement is transmitted (radiated) from the core portion to the clad area while being transmitted through the optical waveguide structure (core portion).

FIG. 6 is a graph explaining the principle of decreasing variations in the wavelength uniformity by setting the aspect ratio of the cross section in the input side of the optical waveguide structure to smaller than "1" as explained in FIG. 4 and FIG. 5, when an axis displacement occurs between the center axis of the optical transmission member and the axial line in the input side of the optical waveguide structure. FIG. 6 shows the results of obtaining the maximum value (curve a) of the loss difference in two output waveguides and the maximum value (curve b) of insertion loss, when light of 260-1660 nm is applied in the state that the center axis of the optical transmission member (optical fiber) and the axial line in the input side of the optical waveguide structure are deviated only by 0.5 μm along the surface of the substrate.

As indicated by the curve a in FIG. 6, it is recognized that the uniformity is increased (a loss difference is decreased) by setting the aspect ratio of the cross section in the input side of the optical waveguide structure. However, as indicated by the curve b, if the aspect is set to lower than 0.5, a loss is rapidly increased. Therefore, when setting the aspect ratio of the cross section in the input side of the optical waveguide structure to smaller than "1", a preferable range is 0.5-0.8 (the uniformity is decreased in 0.8 or larger). This agrees with the cause of decreasing variations in the total loss explained in FIG. 4.

Therefore, an optical branching unit, which has a high wavelength uniformity of insertion loss and a wavelength characteristic difficult to fluctuate even if an axis displacement occurs in packaging, is obtained by setting the cross section shape in the core (the optical waveguide structure 20) in the input side of an optical branch, so that the aspect ratio of the length in the direction along the surface of the substrate 10 (the width of the core) to the length in the direction orthogonal to the surface of the substrate 10 (the height of the core) becomes smaller than "1".

FIG. 7 is a schematic diagram explaining another embodiment of the optical branching unit shown in FIG. 1 and FIG. 2. In FIG. 7, the same components as those explained in FIG. 1 and FIG. 2 are given the same reference numerals, and detailed explanation is omitted.

As shown in FIG. 7, the optical branching unit 101 has a substrate 10 and an optical waveguide structure 120 formed on the substrate 10. The space surrounding the optical waveguide structure is covered by a not-shown clad member to make the optical waveguide structure 120 usable as a core. The optical waveguide structure 120 is constructed by connecting a plurality of optical waveguide structure 20 explained in FIG. 1 and FIG. 2.

Therefore, in the state viewed from the not-shown optical fiber as an optical transmission member to transmit a light beam applied to the optical waveguide structure 120, or the optical branch in the preceding stage (in the state viewed from the left side to the right side in FIG. 7), the optical waveguide structure 120 in the optical branching unit 101 shown in FIG. 7 is branched by the input end 21, input waveguide 24, optical branch 22 and optical branch 22, and branched by the output waveguide 25-1 functioning as an input waveguide of an optical branch 222 in the succeeding stage, and the optical branch 22. The output waveguide 25-2 functioning as an input waveguide of an optical branch 322 in the succeeding stage, optical branches 222 and 322 connected to respective output waveguides, and output waveguides α, β, γ and δ of two branches 222 and 322 are sequentially arranged.

In the optical branching unit 101 shown in FIG. 7, the length in the direction along the surface direction of the substrate 10 of the optical waveguide structure 120 (the y-axis direction), or the width of the part functioning as a core, is $W_A$ in the input waveguide 24 and the input part 22A of the optical branch 22, $W_{22-1}$ or $W_{22-1}$ in the output parts 22-1 and 22-2 of the optical branch 22 or in the vicinity thereof, $W_{25-1}$ or $W_{25-1}$ in the output waveguides 25-1 and 25-2 or in the vicinity thereof, $W_{222A}$ in the input part 222A of the optical branch 222 or in the vicinity thereof, $W_{322A}$ in the input part 322A of the optical branch 322 or in the vicinity thereof, $W_{222-1}$ or $W_{222-2}$ in the output parts 222-1 and 222-2 of the optical branch 222 or in the vicinity thereof, $W_{322-1}$ or $W_{322-2}$ in the output parts 322-1 and 322-2 of the optical branch 322 or in the vicinity thereof, $W_{225-1}$ or $W_{225-2}$ in the output waveguides 225-1 and 225-2 or in the vicinity thereof, and $W_{325-1}$ or $W_{325-2}$ in the output waveguides 325-1 and 325-2 or in the vicinity thereof. Comparing the widths at each position of the part of the optical waveguide structure 120 functioning as a core, $W_A$ $W_{22-1}$ or $W_A$ $W_{22-2}$, $W_{22-1}<W_{25-1}$ or $W_{22-2}<W_{25-2}$, $W_{25-1}>W_{222A}$ or $W_{25-2}>W_{322A}$, $W_{222A}\cong W_{222-1}\cong W_{222-2}$ or $W_{322A}\cong W_{322-1}\cong W_{322-2}$, $W_{222-1}<W_{225-1}$ or $W_{222-2}<W_{225-2}$, and $W_{322-1}<W_{225-1}$ or $W_{322-2}<W_{325-2}$.

Figure 8:
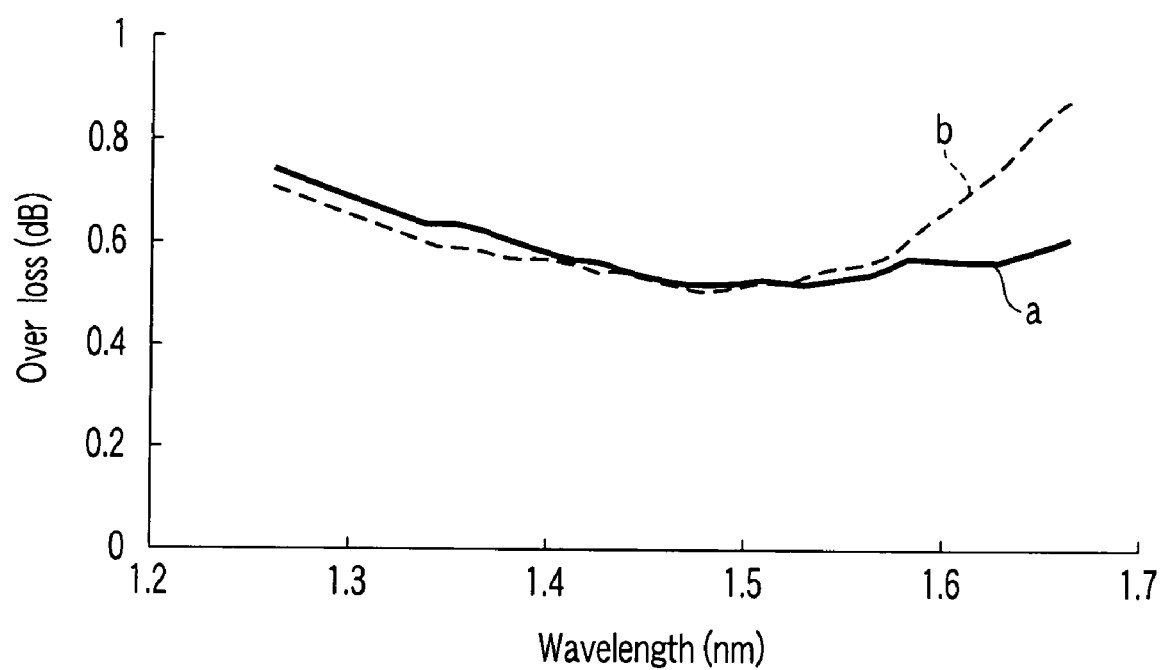
FIG. 8 is a graph explaining changes in an over loss obtained by the optical branching unit shown in FIG. 7.

FIG. 8 shows the results of comparing the largeness of an over loss generated excessively with respect to the path connecting the first stage branch (optical branch 22) and second stage branch (optical branch 222 (or 322)), or the output waveguide 225-1 (or 225-2), when $W_A=W_{25-1}$ (or $W_A=W_{25-2}$) as indicated by the curve b and $W_A<W_{25-1}$ (or $W_A<W_{25-2}$) as indicated by the curve a (the different width part defined to $W_A=WA_{222A}(W_{322A})$ is formed in the output waveguide 225-1 (225-2).

As obvious from FIG. 8, when $W_A<W_{25-1}(W_A<W_{25-2})$ and $W_A=WA_{222A}(W_{322A})$, that is, when at least one of the path connecting the first stage branch and second stage branch, or the output waveguide 225-1 (or 225-2), is given a structure wider than the other areas, an over loss in a longer wavelength range is decreased, and the characteristic of the waveguide is improved.

As explained hereinbefore, according to the present invention, the wavelength uniformity of insertion loss of an optical branching unit to branch a light beam supplied from an optical waveguide or optical fiber. Loss of the whole branching unit can be decreased. Further, a yield in packaging (assembling) an optical transmission line including the optical branching unit is improved.

The invention is not limited to the aforementioned embodiments. Various modifications and variations are possible in a practical stage without departing from its essential characteristics. Each embodiment may be appropriately combined as far as possible. In such a case, the effect by the combination is obtained.

There is provided an optical branching unit having a high wavelength uniformity of insertion loss, which holds a wavelength characteristic uniform, and decreases a loss, even if an axis displacement occurs in packaging.

According to the invention, emission of a multimode component, which is generated when an axis displacement occurs between an input waveguide to input a light beam from the outside of a substrate and an optical transmission member outside the substrate, to an output end of a branching destination is decreased, and variations in the wavelength uniformity of loss is compensated in the output side. Therefore, the wavelength uniformity of loss is improved in each branching destination. Loss of the whole branching unit is decreased. Further, a yield in packaging (assembling) an optical transmission line including an optical branching unit is increased.

What is claimed is:

1. An optical branching unit comprising:
a holding substrate which holds an optical branch structure which branches a light beam;
an input waveguide which guides a light beam from outside of the holding substrate to the optical branch structure, the input waveguide having an end-face at which the light beam is inputted to the input waveguide; and
first and second output waveguides which guide first and second branches of the light beam branched at the optical branch structure to outside of the holding substrate, each of the first and second output waveguides having an end-face from which the first and second branches are outputted from the first and second output waveguides, respectively;
wherein a height of the end-face of the input waveguide in a direction perpendicular to a surface of the holding substrate that holds the optical branch structure is larger than a width of the end-face of the input waveguide in a direction along said surface of the holding substrate in a plane orthogonal to an input direction of the light beam to the input waveguide;
wherein a width of the end-face of the first output waveguide in said direction along said surface of the holding substrate is longer than a height of the end-face of the first output waveguide in said direction perpendicular to said surface of the holding substrate, and a width of the end-face of the second output waveguide in said direction along said surface of the holding substrate is longer than a height of the end-face of the second output waveguide in said direction perpendicular to said surface of the holding substrate.

2. The optical branching unit according to claim 1, wherein a ratio of the width of the end-face of the input waveguide to the height of the end-face of the input waveguide is in a range of 0.5:1 to 0.8:1.

3. The optical branching unit according to claim 1, wherein a ratio of the width of the end-face of the first output waveguide to the height of the end-face of the first output waveguide is in a range of 1.0:1 to 1.5:1, and a ratio of the width of the end-face of the second output waveguide to the height of the end-face of the second output waveguide is in a range of 1.0:1 to 1.5:1.

4. The optical branching unit according to claim 1, wherein the ratio of the width of the end-face of the first output waveguide to the height of the end-face of the first output waveguide is in a range of 1.0:1 to 1.5:1, and a ratio of the width of the end-face of the second output waveguide to the height of the end-face of the second output waveguide is in a range of 1.2:1 to 1.5:1.

5. An optical branching unit supported on a substrate, the optical branching unit comprising:
an input waveguide, on a surface of the substrate, to which light is input from outside of the substrate;
an optical branch, on the surface of the substrate, which branches the light input to the input waveguide; and
output waveguides, on the surface of the substrate, each of which outputs a respective branch of the light branched by the optical branch to the outside of the substrate,
wherein a cross-sectional shape, of a cross-section in a plane orthogonal to an input direction of the light beam to the input waveguide at a position between an input end of the input waveguide and optical branch, is one of a rectangle and another non-circular shape having a height and width that are not equal, and a width of the cross-sectional shape along the surface of the substrate is shorter than a height of the cross-sectional shape in a direction orthogonal to the surface of a substrate; and
wherein, at an outputting end of each output waveguide, a cross-sectional shape, of a cross-section of the output waveguide in a plane orthogonal to a direction of light transmitted from the output waveguide, is one of a rectangle and another non-circular shape having a height and width that are not equal, and a width of the cross-sectional shape along the surface of the substrate is longer than a height of the cross-sectional shape in the direction orthogonal to the surface of a substrate.

6. The optical branching unit according to claim 5, wherein in the cross-sectional shape at the position between the input end of the input waveguide and the optical branch, a ratio of the width of the cross-sectional shape to the height of the cross-sectional shape is in a range of 0.5:1 to 0.81.

7. The optical branching unit according to claim 5, wherein at the outputting end of each output waveguide, a ratio of the width of the cross-sectional shape to the height of the cross sectional shape is in a range of 1.0:1 to 1.5:1.

8. The optical branching unit according to claim 5, wherein at the outputting end of each output waveguide, a ratio of the width of the cross-sectional shape to the height of the cross sectional shape is in a range of 1.2:1 to 1.5:1.

9. An optical branching unit comprising:
a substrate which includes a surface defined by a first direction and a second direction orthogonal to the first direction;
an input waveguide which is provided along the surface of the substrate, and to which light from outside of the substrate is input;
a first optical branching unit which is provided on the surface of the substrate, and which branches the light input to the input waveguide into branches;
a second optical branching unit which is provided on the surface of the substrate, and which further branches a first one of the branches of the light branched by the first optical branching unit;

a third optical branching unit which is provided on the surface of the substrate, and which further branches a second one of the branches of the light branched by the first optical branching unit;

output waveguides which are provided on the surface of the substrate, and each of which outputs a respective branch of the light branched by the second and third optical branching units to the outside of the substrate;

a first intermediate optical waveguide section which connects the first optical branching unit to the second optical branching unit; and a second intermediate optical waveguide section which connects the first optical branching unit to the third optical branching unit;

wherein said second direction extends along said surface of the substrate and is orthogonal to an input direction of the light beam to the input waveguide;

wherein a width along the second direction of a region connecting an input part of the first optical branching unit with the input waveguide, a width along the second direction of a region connecting an input part of the second optical branching unit with the first intermediate optical waveguide section, a width along the second direction of a region connecting an input part of the third optical branching unit with the second intermediate optical waveguide section, and widths along the second direction of regions connecting the first optical branching unit with the first and second intermediate optical waveguide sections are all substantially the same;

wherein the width along the second direction of the region connecting the input part of the first optical branching unit with the input waveguide is smaller than a height along a direction orthogonal to the surface of the substrate of each of: the input waveguide, the first optical branching unit, the second optical branching unit, the third optical branching unit, the output waveguides, and the first and second intermediate optical waveguide sections; and wherein a width along the second direction at a position of the first intermediate optical waveguide section and a width along the second direction at a position of the second intermediate optical waveguide section are longer than: the width along the second direction of the region connecting the input part of the first optical branching unit with the input waveguide, the width along the second direction of the region connecting the input part of the second optical branching unit with the first intermediate optical waveguide section, the width along the second direction of the region connecting the input part of the third optical branching unit with the second intermediate optical waveguide section, and the widths along the second direction of the regions connecting the first optical branching unit with the first and second intermediate optical waveguide sections.

10. The optical branching unit according to claim 9, wherein the ratio of (i) the width along the second direction of the region connecting the input part of the first optical branching unit with the input waveguide, to (ii) the height of each of each of: the input waveguide, the first optical branching unit, the second optical branching unit, the third optical branching unit, the output waveguides, and the first and second intermediate optical waveguide sections, is in a range of 0.5:1 to 0.8:1.

11. The optical branching unit according to claim 9, wherein a ratio of the width along the second direction at said position of the first intermediate optical waveguide section to the height of each of each of: the input waveguide, the first optical branching unit, the second optical branching unit, the third optical branching unit, the output waveguides, and the first and second intermediate optical waveguide sections, is in a range of 1.0:1 to 1.5:1; and wherein a ratio of the width along the second direction at said position of the second intermediate optical waveguide section to the heights of each of each of: the input waveguide, the first optical branching unit, the second optical branching unit, the third optical branching unit, the output waveguides, and the first and second intermediate optical waveguide sections, is in a range of 1.0:1 to 1.5:1.

* * * * *